United States Patent
Debnath et al.

(10) Patent No.: US 10,333,805 B2
(45) Date of Patent: Jun. 25, 2019

(54) ULTRA-FAST PATTERN GENERATION ALGORITHM FOR THE HETEROGENEOUS LOGS

(71) Applicant: NEC Laboratories America, Inc., Princeton, NJ (US)

(72) Inventors: Biplob Debnath, Princeton, NJ (US); Hui Zhang, Princeton Junction, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/956,392

(22) Filed: Apr. 18, 2018

(65) Prior Publication Data

US 2018/0309648 A1    Oct. 25, 2018

Related U.S. Application Data

(60) Provisional application No. 62/488,200, filed on Apr. 21, 2017.

(51) Int. Cl.
| | |
|---|---|
| G06F 17/27 | (2006.01) |
| H04L 12/26 | (2006.01) |
| H04W 4/38 | (2018.01) |
| G06K 9/72 | (2006.01) |
| G06K 9/62 | (2006.01) |
| G06F 16/31 | (2019.01) |
| H04W 4/70 | (2018.01) |

(52) U.S. Cl.
CPC .......... *H04L 43/06* (2013.01); *G06F 16/325* (2019.01); *G06F 17/277* (2013.01); *G06K 9/6253* (2013.01); *G06K 9/726* (2013.01); *H04W 4/38* (2018.02); *H04W 4/70* (2018.02)

(58) Field of Classification Search
USPC ............................................. 704/9
See application file for complete search history.

(56) References Cited

U.S. PATENT DOCUMENTS

| | | | |
|---|---|---|---|
| 8,495,429 B2 | 7/2013 | Fu et al. | |
| 9,928,155 B2* | 3/2018 | Xu | ...................... G06F 11/3612 |
| 2014/0344622 A1 | 11/2014 | Huang et al. | |
| 2015/0025875 A1 | 1/2015 | Perrone | |
| 2017/0256023 A1* | 9/2017 | Li | ........................ G06F 3/0604 |

OTHER PUBLICATIONS

Hamooni et al., "LogMine: Fast Pattern Recognition for Log Analytics", CIKM'16, Oct. 2016, 10 pages.

* cited by examiner

*Primary Examiner* — Susan I McFadden
(74) *Attorney, Agent, or Firm* — Jospeh Kolodka

(57) ABSTRACT

A computer-implemented method for generating patterns from a set of heterogeneous log messages is presented. The method includes collecting the set of heterogenous log messages from arbitrary or unknown systems or applications or sensors or instruments, splitting the log messages into tokens based on a set of delimiters, identifying datatypes of the tokens, identifying a log structure of the log messages by generating pattern-signatures of all the tokens and the datatypes based on predefined pattern settings, generating a pattern for each of the log structures and enabling users to edit the pattern for each of the log structures based on user requirements.

20 Claims, 8 Drawing Sheets

ULTRA-FAST PATTERN GENERATION ALGORITHM FOR THE HETEROGENEOUS LOGS

RELATED APPLICATION INFORMATION

This application claims priority to Provisional Application No. 62/488,200, filed on Apr. 21, 2017, incorporated herein by reference in its entirety.

BACKGROUND

Technical Field

The present invention relates to generating logs and, more particularly, to an ultra-fast pattern generation algorithm for heterogeneous logs.

Description of the Related Art

The Internet of Things (IoT) enables advanced connectivity of computing and embedded devices through Internet infrastructure. Although computers and smartphones are the most common devices in IoT, the number of "things" is expected to grow to 50 billion by 2020. IoT involves machine-to-machine communications (M2M), where it is important to continuously monitor connected machines to detect any anomaly or bug, and resolve them quickly to minimize downtime. Logging is a mechanism employed to record machine behaviors and various states for maintenance and troubleshooting. An acceptable logging standard is yet to be developed for IoT, most commonly due to the enormous varieties of "things" and their fast evolution over time. Thus, it is challenging to parse and analyze log messages from systems like IoT.

SUMMARY

A computer-implemented method for generating patterns from a set of heterogeneous log messages is presented. The method includes collecting the set of heterogenous log messages from arbitrary or unknown systems or applications or sensors or instruments, splitting the log messages into tokens based on a set of delimiters, identifying datatypes of the tokens, identifying a log structure of the log messages by generating pattern-signatures of all the tokens and the datatypes based on predefined pattern settings, generating a pattern for each of the log structures, and enabling users to edit the pattern for each of the log structures based on user requirements.

A system for generating patterns from a set of heterogeneous log messages is also presented. The system includes a memory and a processor in communication with the memory, wherein the processor is configured to collect the set of heterogenous log messages from arbitrary or unknown systems or applications or sensors or instruments, split the log messages into tokens based on a set of delimiters, identify datatypes of the tokens, identify a log structure of the log messages by generating pattern-signatures of all the tokens and the datatypes based on predefined pattern settings, generate a pattern for each of the log structures, and enable users to edit the pattern for each of the log structures based on user requirements.

A non-transitory computer-readable storage medium comprising a computer-readable program is presented for generating patterns from a set of heterogeneous log messages, wherein the computer-readable program when executed on a computer causes the computer to perform the steps of collecting the set of heterogenous log messages from arbitrary or unknown systems or applications or sensors or instruments, splitting the log messages into tokens based on a set of delimiters, identifying datatypes of the tokens, identifying a log structure of the log messages by generating pattern-signatures of all the tokens and the datatypes based on predefined pattern settings, generating a pattern for each of the log structures, and enabling users to edit the pattern for each of the log structures based on user requirements.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
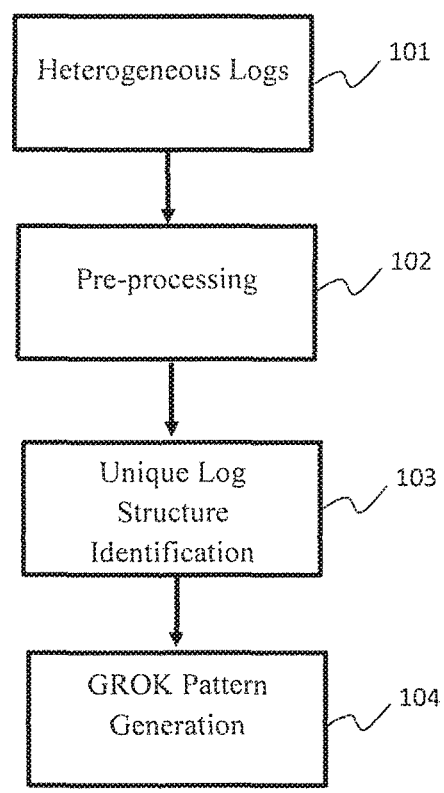
FIG. 1 is a block/flow diagram illustrating a pattern discovery procedure, in accordance with embodiments of the present invention.

In the exemplary embodiments of the present invention, methods and devices are presented for generating a set of regular expressions (patterns) from a set heterogeneous logs so that all logs or log messages are correctly and accurately parsed. Computers talk by generating logs. Social networks, computer networks, smart cities, etc. are generating a huge number of logs or log messages every day. There is a demand for analyzing these logs from a system administration perspective. One component of a log analysis tool is recognizing patterns. Having a set of patterns that cover all the logs or log messages enables administrators to perform further analysis such as anomaly detection, event prediction, etc. All logs generated by real applications have an underlying structure. Assuming the existence of this structure enables the design of a pattern recognition method that outperforms existing designs. As such, the exemplary embodiments introduce an Ultra-Fast Pattern Generator (UFPA), which extracts high quality patterns for a given set of logs or log messages. The exemplary method is fast, memory efficient, accurate and scalable, and the method can be implemented in parallel fashion. The method is also completely unsupervised and data-driven, which allows the method to handle heterogeneous logs or log messages.

In the exemplary embodiments of the present invention, methods and devices are provided for an end-to-end framework referred to as UFPA, which is an unsupervised framework that scans log messages only once; therefore, it can quickly process hundreds of millions of log messages with a small amount of memory. UFPA supports three different settings, which is very intuitive for users to understand. In addition, UFPA allows users to automatically edit generated patterns to meet their needs.

The exemplary embodiments further provide a novel log analytics framework, UFPA, which recognizes patterns in millions of log messages. UFPA is an unsupervised framework requiring no involvement of an expert in the analysis process. UFPA is robust to heterogeneity and is capable of finding patterns in logs generated from arbitrary applications or sensors or instruments running on arbitrary platforms. UFPA is scalable to hundreds of millions of logs. UFPA reads an entire set of logs once and stores only a very small subset of logs. UFPA is flexible as it has three predefined settings, that is, HIGH, MEDIUM, and LOW. The default setting is MEDIUM. These three settings are intuitive to users, and provide upper and lower bounds of the number of patterns that will be automatically generated. The "HIGH" setting generates the largest number of patterns, while the "LOW" setting generates the lowest number of patterns, and the "MEDIUM" setting generates fewer patterns than the number of patterns produced by the "HIGH" setting and more patterns than the number of patterns produced by the "LOW" setting. In addition, UFPA allows users to automatically edit generated patterns to meet their needs.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a block/flow diagram illustrating a pattern discovery procedure, in accordance with embodiments of the present invention.

Concerning the UFPA algorithm, given a log dataset, UFPA discovers a set of patterns, which can be used to parse logs. Stated differently, UFPA provides a mechanism to convert unstructured logs into structured forms, which can be employed later for building various log analytics. In the exemplary embodiments, a pattern is defined as a GROK expression. GROK allows a user to convert unstructured log text into structured data. GROK is a way to match a line against a regular expression, map specific parts of the line into dedicated fields, and perform actions based on this mapping. A GROK filter attempts to match a field with a pattern. A pattern can be thought of as a named regular expression.

For example, for the log "UFPA is published in 2017", one of the matching GROKs (i.e., patterns) is "%{WORD:Title} is published in %{NUMBER:Year}", and after parsing the UFPA provides: "Title": "UFPA," "Year": 2017" as an output in JSON format. UFPA can handle logs from heterogeneous sources without any human supervision.

In particular, UFPA has the following properties:

UFPA is unsupervised: UFPA can work from scratch without any prior knowledge or human supervision. For logs or log messages from new sources, UFPA does not require any human inputs.

UFPA supports heterogeneity: Logs or log messages can be generated from different applications and systems. Each system can generate logs in multiple formats. UFPA can handle any log formats irrespective of their origins.

UFPA supports scalability: A log parser should be scalable as log volume and velocity could be very high. UFPA runs an order of magnitude faster than conventional algorithms.

UFPA supports flexibility: UFPA provides users an option to automatically edit generated patterns to meet their specific needs. UFPA also provides an upper bound and a lower bound of the patterns count to be generated by allowing users to select one of the three predefined settings.

The pattern discovery procedure includes a heterogeneous log collection module 101, a pre-processing log module 102, a unique log structure identification module 103, and GROK pattern generation module 104.

The heterogeneous log collection module 101 collects heterogeneous logs from arbitrary or unknown systems or applications or sensors or instruments. Logs or log messages include unstructured text content with one or multiple fields. Logs or log messages can also include timestamps.

The pre-processing log module 102 pre-processes a log by splitting the log into tokens and identifying datatypes of the tokens.

The unique log structure identification module 103 identifies unique log structures of the pre-processed logs based on the HIGH, or MEDIUM, or LOW pattern settings.

The GROK pattern generation module 104 generates a GROK pattern for each unique log structure.

Figure 2:
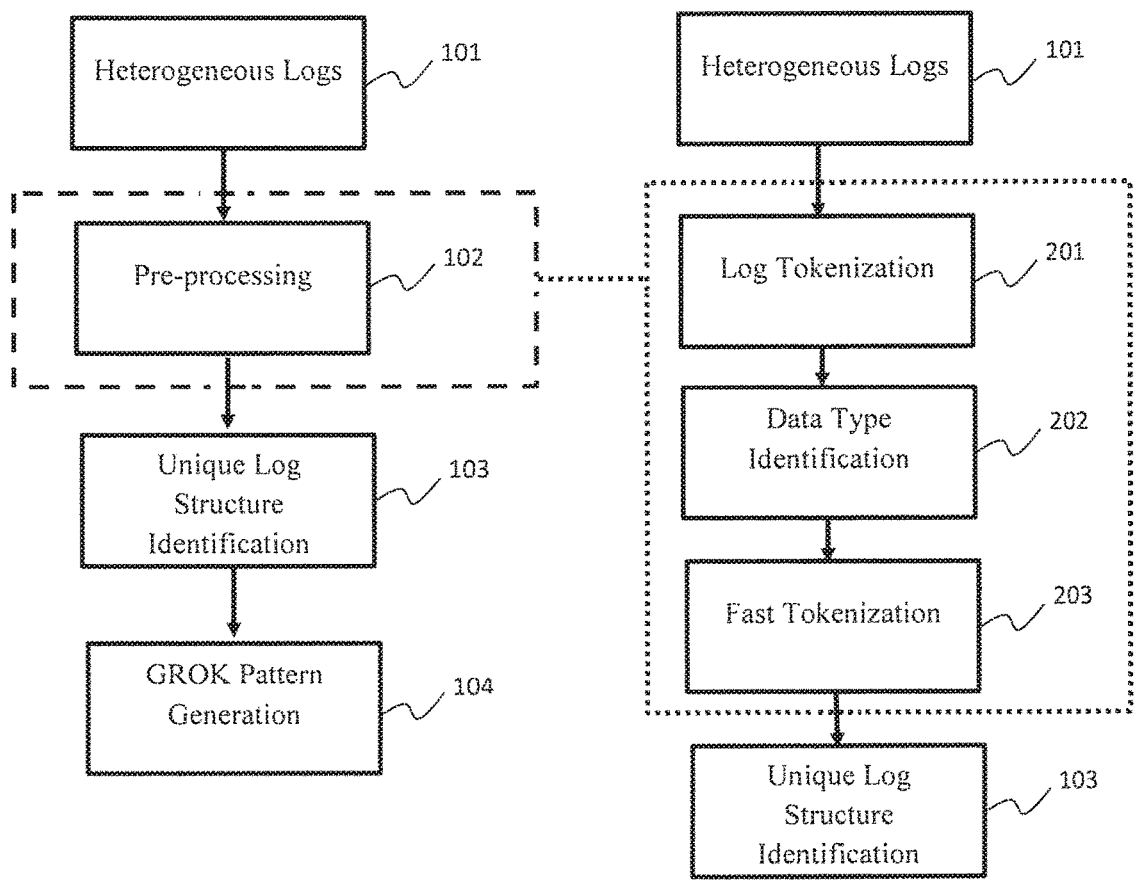
FIG. 2 is a block/flow diagram illustrating a log preprocessing procedure, in accordance with embodiments of the present invention.

FIG. 2 is a block/flow diagram illustrating a log pre-processing procedure, in accordance with embodiments of the present invention.

The pre-processing log module 102 includes a log tokenization module 201, a datatype identification module 202, and a fast tokenization module 203.

The log tokenization module 201 takes arbitrary heterogeneous logs (step 101), and a tokenization is processed in order to generate semantically meaningful tokens from logs. The log tokenization module 201 pre-processes a log by splitting the log into individual units called "tokens." Splitting is performed based on a set of delimiters. The default delimiter set includes white space characters (e.g., space, tab, etc.). The Ultra-Fast Pattern Generator (UFPA) also allows users to provide delimiters to overwrite default delimiters in order to meet their needs. In addition, users can provide regular expression (RegEx) based rules to split a token into multiple sub-tokens.

For example, to split the token "123 KB" into two sub-tokens "123" and "KB," a user can provide the following RegEx splitting rule: "[0-9]+KB"→"[0-9]+KB".

Concerning the datatype identification module 202, for every token, UPFA identifies various data types, such as DATETIME, IP, WORD, NUMBER, and NOTSPACE (e.g., mix of alphabets, digits, and symbols) based on RegEx rules.

Table 1 below depicts sample RegEx rules for identifying different data types in UFPA.

TABLE 1

Sample RegEx rules for identifying different datatypes syntax

| Datatype | Regular Expression (RegEx) Syntax |
|---|---|
| WORD | [a-zA-Z]+ |
| IP | [0-9]{1,3}.[0-9]{1,3}.[0-9]{1,3}.[0-9]{1,3} |
| DATETIME | [0-9]{4}/[0-9]{2}/[0-9]{2} [0-9]{2}:[0-9]{2}:[0-9]{2}.[0-9]{3} |
| NUMBER | -?[0-9]+([0-9]+)? |
| NOTSPACE | \S+ |
| SPACE | \s+ |
| DATA | .*? |
| GREEDYDATA | .* |

In this step, UFPA also identifies a date and time (e.g., timestamp) and unifies them into single a DATETIME format "yyyy/MM/dd HH:mm:ss.SSS." However, it is a cumbersome process due to the heterogeneity of data and time formats. UFPA also allows users to provide date and time formats to identify timestamp fields.

However, if a user does not specify any formats, UFPA identifies timestamps based on a set of predefined formats (e.g., MM/dd HH:mm:ss, dd/MM HH:mm:ss.SSS, yyyy/MM/dd HH:mm:ss.SSS, etc.) specified in a standard notation (e.g., Java Simple Date Format). The worst case time complexity of identifying a timestamp by employing a set of predefined date and time format is O(k), where k is the total number predefined date and time formats.

The fast tokenization module 203 splits a token by splitting RegEx rules and identifies its datatype by using datatype syntax expressed in the RegEx rules. A token could correspond to any of the datatypes. In addition, an ordering of the RegEx rules (e.g., DATETIME→IP→NUMBER-→WORD→NOTSPACE) needs to be followed, and some datatypes (e.g., DATETIME) cover multiple consecutive tokens. The worst case time complexity of splitting a token is O(s), where s is the total number of RegEx splitting rules, and the worst case time complexity of identifying a datatype of a token is O(d), where d is the total number of RegEx rules corresponding to the datatype syntax.

Figure 3:
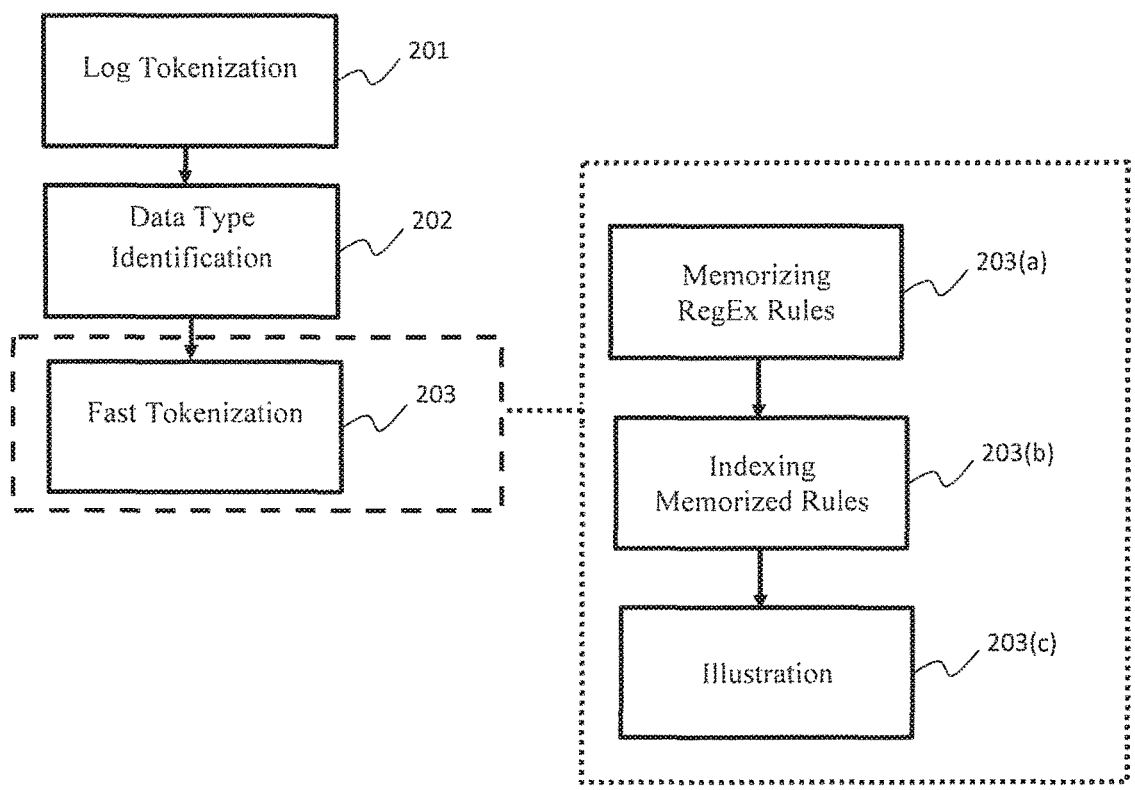
FIG. 3 is a block/flow diagram illustrating a solution to speed up the tokenization process, in accordance with embodiments of the present invention.

UFPA proposes the solution of FIG. 3 to speed-up the tokenization process.

FIG. 3 is a block/flow diagram illustrating a solution to speed up the tokenization process, in accordance with embodiments of the present invention.

The solution to speed up the tokenization process includes memorizing RegEx rules 203(a), indexing memorized rules 203(b), and illustration 203(c).

Regarding memorizing RegEx rules 203(a), whenever a log is received, UFPA follows three steps:

In Step 1: UFPA first tokenizes the log by employing a delimiters list.

In Step 2: For every token, UFPA finds out if any splitting RegEx rule matches. If there is match, UFPA splits the token into multiple tokens based on that rule, where the time complexity is O(s) for each token.

In Step 3: For every matched token, UFPA finds its datatypes by employing the datatypes RegEx syntax rules, where the time complexity is O(d) for each token.

If a log has t tokens after Step 1, then overall time complexity of this three-step process would be O(t*s*d). Therefore, if there are n total logs to be pre-processed, the total complexity would be O(n*t*s*d). UPFA reduces an amortized time complexity to O(n*t) by memorizing the RegEx rule in every token based on its position in a log message by applying the following:

Regarding indexing memorized rules 203(b), after Step 1 in 203(a), UFPA determines if a token corresponds to the datatype of either IP, or NUMBER, or WORD, or NOTSPACE based on its position in the log message. Now, UFPA proceeds to Step 2 of 203(b). Once Step 2 is completed, UFPA memorizes the splitting rule (if any) and applies it to a token based on its position in Step 1. Next, it proceeds to Step 3 of 203(c). Once Step 3 is finished, UFPA memorizes the datatype syntax rule and applies it to a token based on its position in Step 2.

For consecutive tokens forming DATETIME datatype, UFPA memorizes the predefined format (or one of the used specified formats, if any) that is employed to unify the date and time information. To apply the memorized information to the subsequent logs having similar position-wise tokens, UFPA maintains, e.g., two hash indexes. The first index speeds up the splitting procedure by reducing the time complexity of Step 2 of 203(a) to O(1), and the second index speeds up the datatype identification procedure by reducing the time complexity of the Step 3 of 203(a) to O(1).

Regarding illustration 203(c), to illustrate 203(a) and 203(b), the method pre-processes the log "2017 Apr. 16 11:00:00.000 127.0.0.1 123 KB received." In Step 1, 203(a) generates five tokens using white space as a delimiter for this log: "Apr. 16, 2017", "11:00:00.000", "127.0.0.1", "123 KB", and "received" positioned by 1, 2, 3, 4, and 5, respectively. Now, UFPA finds out if a token corresponds to the datatype of either IP, or NUMBER, or WORD, or NOTSPACE based on its position in the log message.

UFPA finds that the datatype of these five tokens are NOTSPACE, NOTSPACE, IP, NOTSPACE, and WORD, respectively.

It is assumed that a user provides the following two splitting rules:

(1) "[0-9]+[KMGT]B"→"[0-9]+[KMGT]B", and
(2) "User#[0-9]+"→"User# [0-9]+"

Now, by following Step 2 of 203(a), UFPA finds that only the fourth token needs to be split and UFPA applies splitting rule (1), where it splits "123 KB" into two sub-tokens "123" and "KB". Thus, after this step, UFPA has six tokens: "2017 Apr. 16", "11:00:00.000", "127.0.0.1", "123", and KB", and "received." UFPA memorized this information by forming a key-value pair, and maintains a hash-index based on the key.

The key is formed as follows:

The combination of the token's datatype and its position are concatenated by "–" and tokens are separated by a space. For this example, the index key would be "NOTSPACE-1 NOTSPACE-2 IP-3 NOTSPACE-4 WORD-5".

The value is an array of token-position and splitting rule pairs. In this case, the value would be [{4, 1}]. The first hash index is updated with a "key" as "NOTSPACE-1 NOTSPACE-2 IP-3 NOTSPACE-4 WORD-5" and "value" as [{4, 1}].

Before proceeding to the Step 203(c), UFPA identifies if the new sub-tokens correspond to the datatype of either IP, or NUMBER, or WORD, or NOTSPACE. The datatypes of "123" is NUMBER and "KB" is WORD. So, the datatype of these six tokens are NOTSPACE, NOTSPACE, IP, NUMBER, WORD, and WORD, respectively, and positioned by 1, 2, 3, 4, 5, and 6, respectively.

Next, UFPA identifies the datatypes of these six tokens by employing the datatype syntax rules of Table 1 following Step 203(c). UFPA finds that the first and second tokens will be together and covered by DATETIME datatype, the third token is an IP datatype, the fourth token is a NUMBER datatype, the fifth token is a WORD datatype, and the sixth token is a WORD datatype. UFPA memorized this information by forming a key-value pair, and maintains a hash-index based on the key.

The key is formed as follows:

The combination of the token's datatype and its position are concatenated by "-" and tokens are separated by a space. For this example, the index key would be "NOTSPACE-1 NOTSPACE-2 IP-3 NUMBER-4 WORD-5 WORD-6." The value is an array of token-positions and datatype pairs. In this case, the value would be [{[1,2], DATETIME}, {[3], IP}, {[4], NUMBER}, {[5], WORD}, {[6], WORD}]. The second hash index can be updated with a "key" as "NOTSPACE-1 NOTSPACE-2 IP-3 NUMBER-4 WORD-5 WORD-6" and a "value" as [{[1,2], DATETIME}, {[3], IP}, {[4], NUMBER}, {[5], WORD}, {[6], WORD}].

Now, it is assumed that a subsequent log needs to be processed, e.g., "2017 Apr. 16 11:00:01.000 192.0.0.1 123 KB received." Now, after Step 1 of 203(*a*), from the tokens and their positions in the logs, UFPA forms the index key "NOTSPACE-1 NOTSPACE-2 IP-3 NOTSPACE-4 WORD-5" and looks up in the first index table to quickly find out which splitting rule applies to every token. UFPA finds that index lookup is successful and only the fourth token needs to be split by the first splitting rule. Note that, if lookup is unsuccessful, UFPA finds the splitting information following Step 2 of 203(*a*), and memorizes it in the first index.

After splitting, UFPA forms the new index key "NOTSPACE-1 NOTSPACE-2 IP-3 NUMBER-4 WORD-5 WORD-6" for the second index lookup to quickly identify the datatype of every token. In this case, UFPA finds the lookup successful and directly identifies the datatypes by leveraging the memorized information as [{[1,2], DATETIME}, {[3], IP}, {[4], NUMBER}, {[5], WORD}, {[6], WORD}]. By leveraging the memorized information from the second index, UFPA directly finds that the first and second tokens will be together and covered by DATETIME datatype, the third token is an IP datatype, the fourth token is a NUMBER datatype, the fifth token is a WORD datatype, and the sixth token is a WORD datatype. Note that, if the lookup is unsuccessful, UFPA finds the datatype information following Step 3 of 203(*a*), and memorizes it in the second index.

Figure 4:
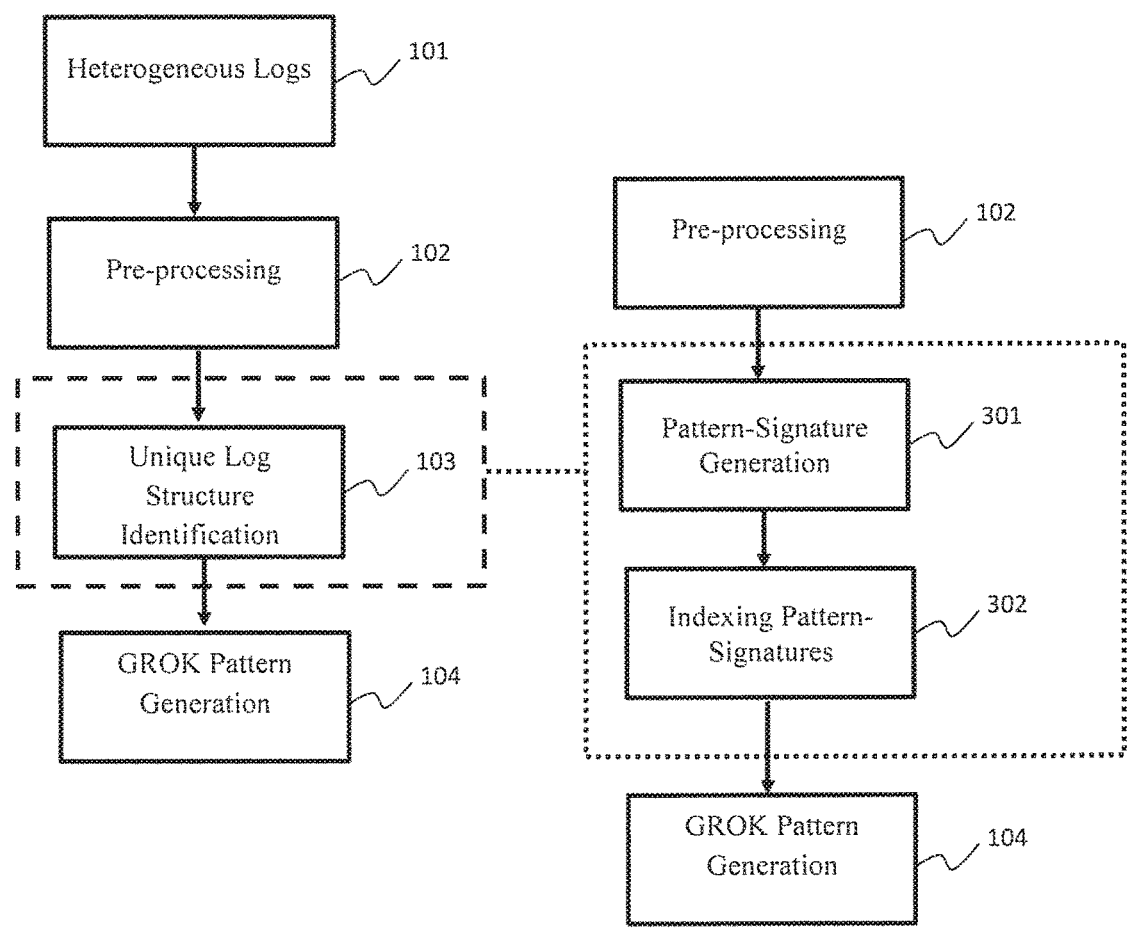
FIG. 4 is a block/flow diagram illustrating a unique log structure identification procedure, in accordance with embodiments of the present invention.

FIG. 4 is a block/flow diagram illustrating a unique log structure identification procedure, in accordance with embodiments of the present invention.

The unique log structure identification module 103 includes a pattern-signature generation module 301 and an indexing pattern-signatures module 302.

The pattern-signature generation module 301 identifies unique log structures from the information generated in Step 2 by generating pattern-signatures. UFPA generates a pattern-signature for every log by concatenating all of its tokens and datatypes based on different settings, such as HIGH, MEDIUM, and LOW. These settings are defined in Table 2 below.

Intuitively, the HIGH setting treats DATETIME, IP, and NUMBER tokens as variable fields, the LOW setting treats all tokens as variable fields, and the MEDIUM setting treats all tokens except alphabet based tokens (e.g., WORD) as variable fields. The HIGH setting produces the largest numbers of patterns, while the LOW setting produces the fewest number of patterns. The MEDIUM setting produces patterns in between the HIGH and the LOW settings.

UFPA uses the MEDIUM setting as the default setting based on the following intuition, that is, the MEDIUM setting does not treat words as variable fields, and usually programmers express debugging information in meaningful words.

Table 3 below depicts an example of pattern signatures using three different pattern settings for a sample log message.

TABLE 2

Description of different pattern settings

| Setting | Datatype Identification |
|---|---|
| HIGH | DATETIME, IP, NUMBER |
| MEDIUM | DATETIME, IP, NUMBER, NOTSPACE |
| LOW | DATETIME, IP, NUMBER, NOTSPACE, WORD |

TABLE 3

Pattern-signatures for "2017 Feb. 23 09:00:31.00 127.0.0.1 UFPA demo#1 123" using three different settings.

| Seting | Pattern-Signature |
|---|---|
| HIGH | (DATETIME) (IP) UFPA demo#1 (NUMBER) |
| MEDIUM | (DATETIME) (IP) UFPA (NOTSPACE) (NUMBER) |
| LOW | DATETIME) (IP) (WORD) (NOTSPACE) (NUMBER) |

Regarding the indexing pattern-signatures module 302, UFPA determines the uniqueness of pattern-signatures by maintaining an index. An index entry includes pattern-signature as "key" and its associated metadata as "value." Metadata is a counter value. Later, UFPA employs this to generate statistics for the patterns, e.g., the total number of logs parsed by each pattern. For every log, UFPA searches this index using its pattern-signature. If a match is found, it indicates that UFPA already discovered a log having similar log-structure, so UFPA discards it and increases the counter by one. Otherwise, UFPA stores the pattern-signature with associated metadata in the index, and sets the counter value to one.

Regarding the GROK pattern generation module 104, UFPA generates one pattern for every pattern-signature index entry in the form of a GROK expression. UFPA assigns a field ID for each variable field generated from a data type. The field ID includes two parts: the ID of the log pattern that this field belongs to, and the sequence number of this field compared to other fields in the same pattern. The log format pattern IDs can be assigned with the integer number 1, 2, 3, . . . m for a log pattern set of size m, and the field sequence order can be assigned with the integer number 1, 2, 3, . . . k for a log pattern with k data types.

Table 4 depicts GROK patterns produced for the three pattern setting specifications.

TABLE 4

GROK patterns for "2017 Feb. 23 09:00:31.000 127.0.0.1 UFPA demo#1 123" based on signatures in Table 3 described above.

| Setting | GROK Pattern |
|---|---|
| HIGH | %{DATETIME:P1F1} %{IP:P1F2} UFPA demo#1 %{NUMBER:P1F3} |
| MEDIUM | %{DATETIME:P1F1} %{IP:P1F2} UFPA %{NOTSPACE:P1F3} %{NUMBER:P1F4} |
| LOW | %{DATETIME:P1F1} %{IP:P1F2} %{WORD:P1F3} %{NOTSPACE:P1F4} %{NUMBER:P1F5} |

Regarding pattern editing, since UFPA automatically generates patterns, patterns may not meet users' expectation. Specially, as UFPA generates generic field names, it may be hard for the user to interpret field contents.

For example, UFPA may assign "P1F1" as a field name for a logID field. In addition, users may want to generate patterns from one system, and later want to apply them to different similar systems with some minor modifications. Thus, to provide flexibility to the users, UFPA allows users to automatically edit generated patterns. For every pattern, UFPA shows GROK pattern, an example log message, and parsing output so that users can edit a pattern to meet their specific needs. UFPA also allows users put semantic meaning by renaming field names. For example, UFPA may assign "P1F1" for logID field, but users can rename it to "logID" by leveraging their domain knowledge. In addition, users can edit field definitions to include multiple tokens under one field. To support this feature, UFPA introduces two new datatypes, that is, DATA and GREEDYDATA datatypes, which are defined in Table 1 above.

Regarding memory usage, the memory requirement for generating patterns depends on the space needed for storing the pattern-signature index described above, and the index size does not depend on the total number of log processed, rather it depends on the unique number of pattern-signatures. In reality, the number of unique signatures is significantly fewer than the logs, so index size may not be an issue. However, if the log processing system has very limited memory, especially in embedded devices, then the following solution can be applied: in this case any on-disk key-value stores can be used to store the index(es).

Figure 5:
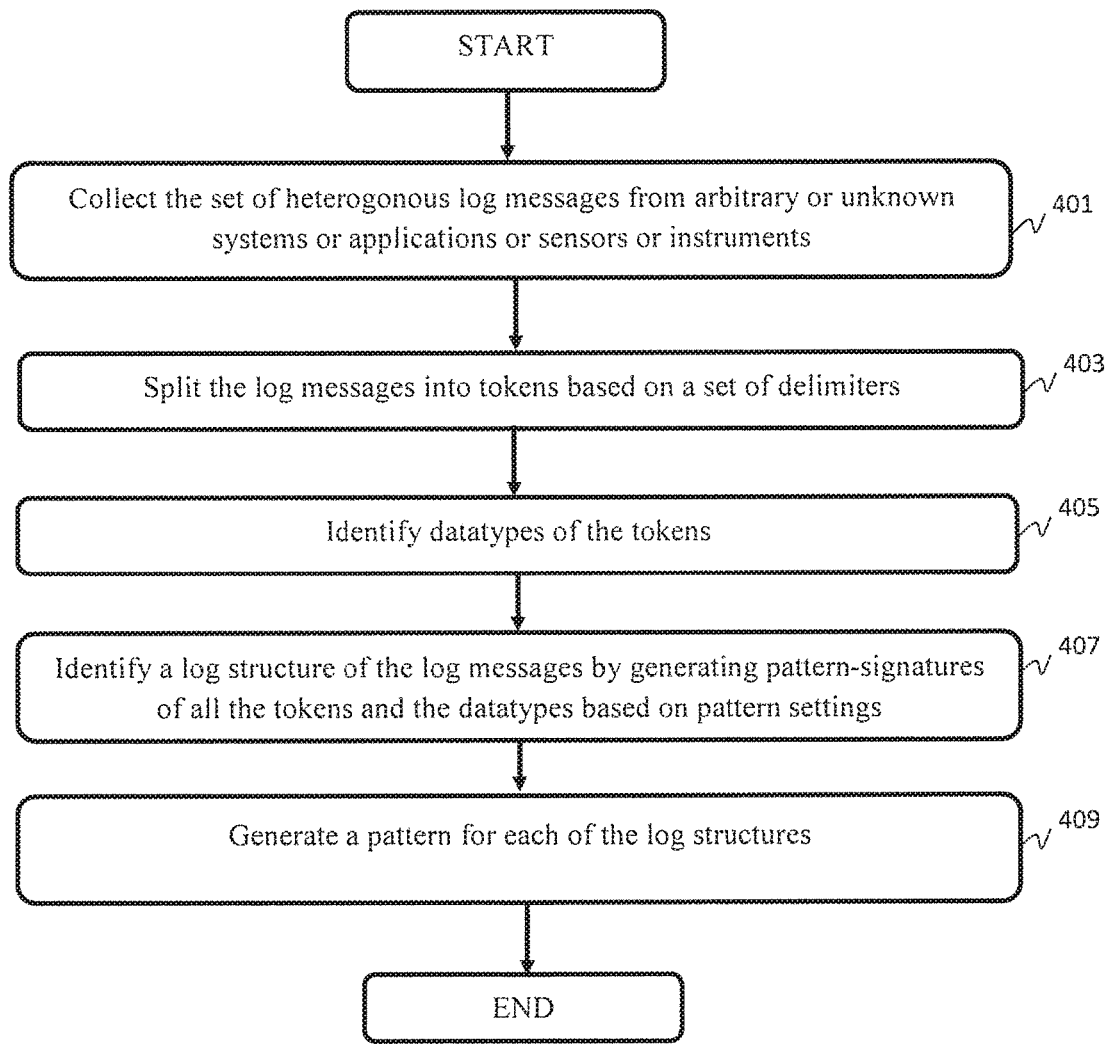
FIG. 5 is a block/flow diagram illustrating a method for generating a set of regular expressions from set heterogeneous logs, in accordance with embodiments of the present invention.

FIG. 5 is a block/flow diagram illustrating a method for generating a set of regular expressions from set heterogeneous logs, in accordance with embodiments of the present invention.

At block 401, a set of heterogenous log messages is collected from arbitrary or unknown systems or applications or sensors or instruments.

At block 403, the log messages are split into tokens based on a set of delimiters.

At block 405, the datatypes of the tokens are identified.

At block 407, a log structure of the log messages is identified by generating pattern-signatures of all the tokens and the datatypes based on pattern settings.

At block 409, a pattern for each of the log structures is generated.

In summary, the exemplary embodiments of the present invention disclose an algorithm with no (or minimal) human involvement. The algorithm is a fast and memory-efficient pattern recognition algorithm which is designed to work with logs generated by computer programs. The algorithm can also be described as a one-pass algorithm. Thus, the algorithm can be applied to streaming logs without any separate training phases. The exemplary embodiments provide an option to users to control the quality of the patterns by specifying three different levels: HIGH, MEDIUM, and LOW. Therefore, the exemplary embodiments of the present invention address the issue of efficiently generating a set of regular expressions from a set of heterogeneous logs so that all logs can be correctly parsed. The regular expression is denoted as a "pattern."

Figure 6:
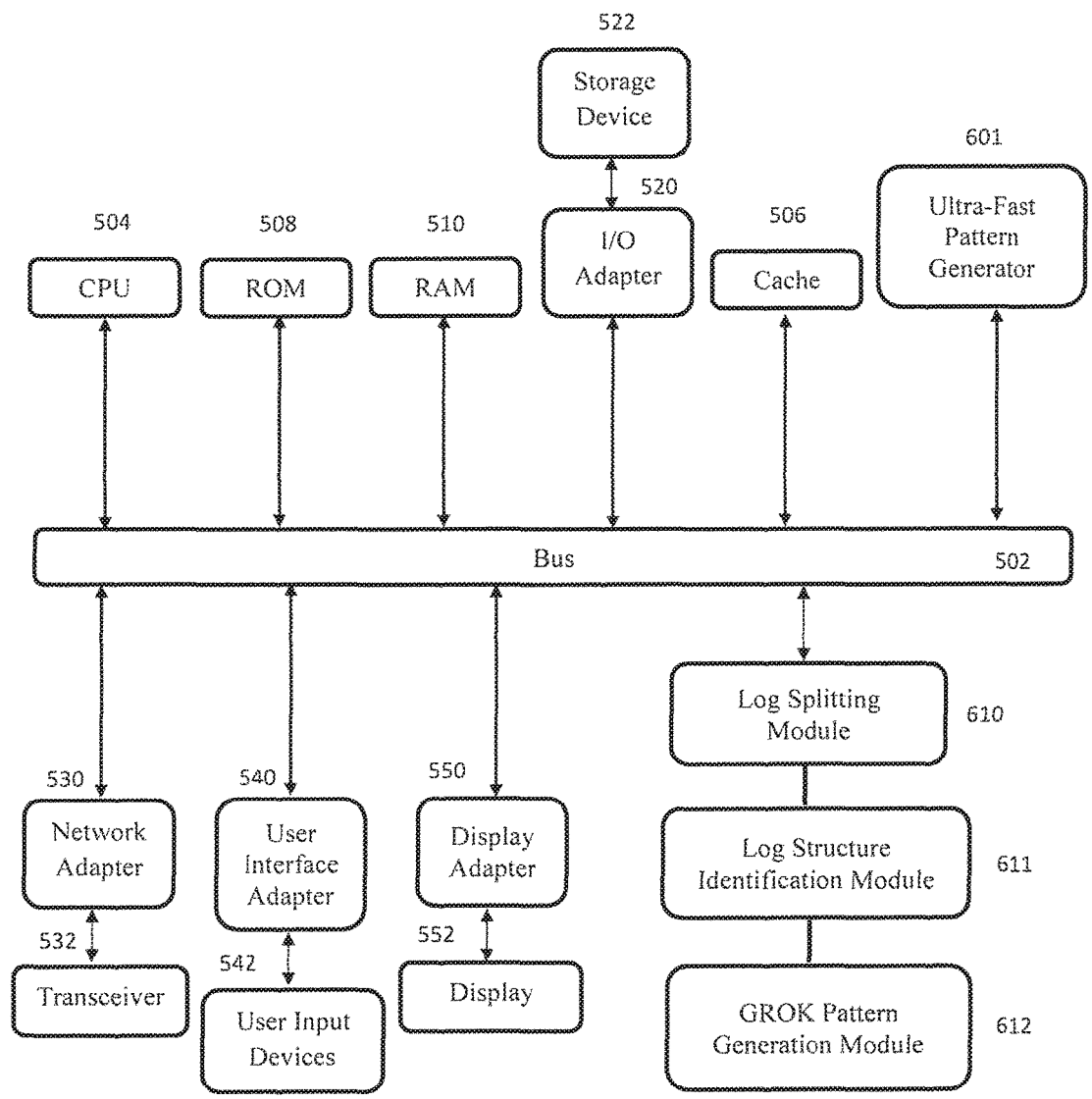
FIG. 6 is an exemplary processing system for generating a set of regular expressions from set heterogeneous logs, in accordance with embodiments of the present invention.

FIG. 6 is an exemplary processing system for generating a set of regular expressions from set heterogeneous logs, in accordance with embodiments of the present invention.

The processing system includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 530, a user interface adapter 540, and a display adapter 550, are operatively coupled to the system bus 502. Additionally, an ultra-fast pattern generator (UFPA) 601 for employing pattern generation is operatively coupled to the system bus 502. The UFPA 601 achieves pattern generation by employing a log splitting module 610, a log structure identification module 611, and a GROK pattern generation module 612.

A storage device 522 is operatively coupled to system bus 502 by the I/O adapter 520. The storage device 522 can be any of a disk storage device (e.g., a magnetic or optical disk storage device), a solid state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the UFPA processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the UFPA network processing system are readily contemplated by one of ordinary skill in the art given the teachings of the present invention provided herein.

Figure 7:
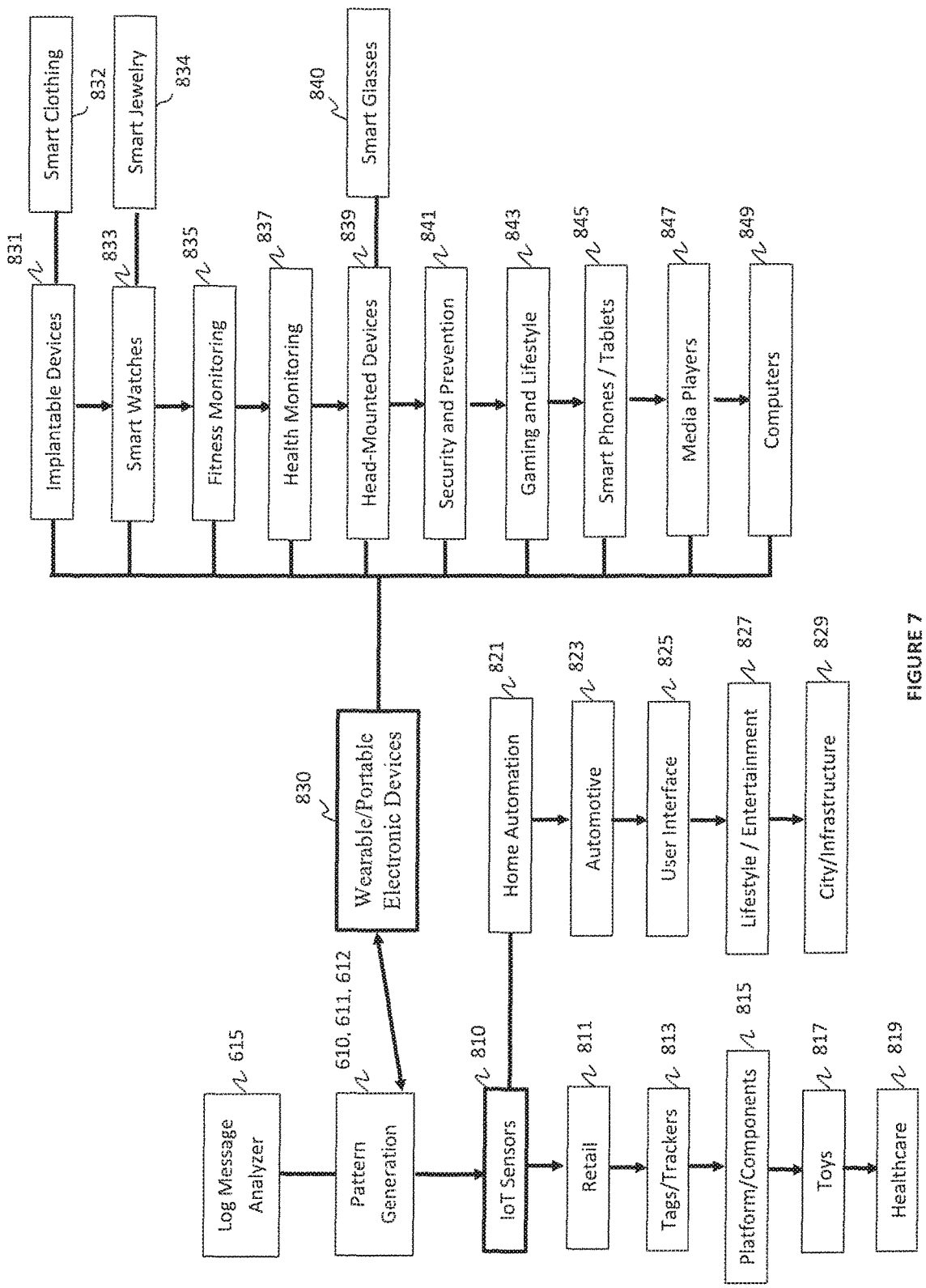
FIG. 7 is a block/flow diagram of an exemplary method for generating a set of regular expressions (patterns) from set heterogeneous logs in Internet of Things (IoT) systems or devices or infrastructure, in accordance with embodiments of the present invention.

FIG. 7 is a block/flow diagram of a method for generating a set of regular expressions from set heterogeneous logs in Internet of Things (IoT) systems or devices or infrastructure, in accordance with embodiments of the present invention.

According to some exemplary embodiments of the invention, a log processing system is implemented using an IoT methodology, in which a large number of ordinary items are utilized as the vast infrastructure of a log processing system. Of course, the log messages can be received from any computing devices and systems not limited to IoT.

IoT enables advanced connectivity of computing and embedded devices through Internet infrastructure. IoT involves machine-to-machine communications (M2M), where it is important to continuously monitor connected machines to detect any anomaly or bug, and resolve them quickly to minimize downtime.

The log message analyzer 615 (and pattern generator modules 610, 611, 612) can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The log message analyzer 615 described herein can be incorporated into any type of electronic devices for any type of use or application or operation.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the log message analyzer 615 of the present invention can be incorporated into a variety of different devices and/or systems. For example, the log message analyzer 615 can be incorporated into wearable or portable electronic devices 830. Wearable/portable electronic devices 830 can include implantable devices 831, such as smart clothing 832. Wearable/portable devices 830 can include smart watches 833, as well as smart jewelry 834. Wearable/portable devices 830 can further include fitness monitoring devices 835, health and wellness monitoring devices 837, head-mounted devices 839 (e.g., smart glasses 840), security and prevention systems 841, gaming and lifestyle devices 843, smart phones/tablets 845, media players 847, and/or computers/computing devices 849.

The log message analyzer 615 of the present invention can be further incorporated into Internet of Thing (IoT) sensors 810 for various applications, such as home automation 821, automotive 823, user interface 825, lifestyle and/or entertainment 827, city and/or infrastructure 829, retail 811, tags and/or trackers 813, platform and components 815, toys 817, and/or healthcare 819. The IoT sensors 810 can communicate with the log message analyzer 615. Of course, one skilled in the art can contemplate incorporating such log message analyzer 615 formed therein into any type of electronic devices for any types of applications, not limited to the ones described herein.

Figure 8:
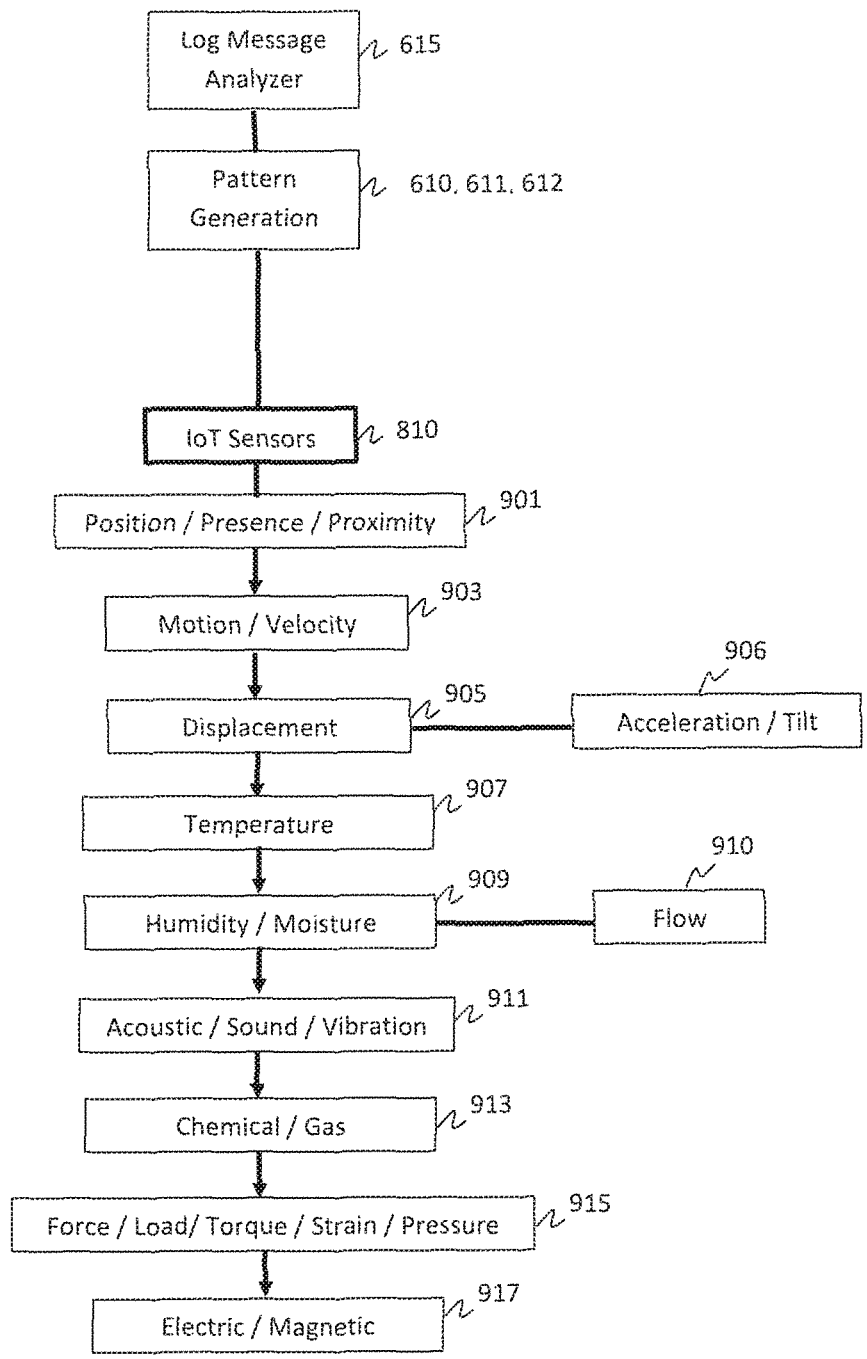
FIG. 8 is a block/flow diagram of exemplary IoT sensors used to collect data/information related to generate a set of regular expressions (patterns) from set heterogeneous logs, in accordance with embodiments of the present invention.

FIG. 8 is a block/flow diagram of exemplary IoT sensors used to collect data/information related to generate a set of regular expressions from set heterogeneous logs, in accordance with embodiments of the present invention.

IoT loses its distinction without sensors. IoT sensors act as defining instruments which transform IoT from a standard passive network of devices into an active system capable of real-world integration.

The IoT sensors 810 can be connected via log message analyzer 615 to transmit information/data, continuously and in real-time, to any type of log message analyzer 615. Exemplary IoT sensors 810 can include, but are not limited to, position/presence/proximity sensors 901, motion/velocity sensors 903, displacement sensors 905, such as acceleration/tilt sensors 906, temperature sensors 907, humidity/moisture sensors 909, as well as flow sensors 910, acoustic/sound/vibration sensors 911, chemical/gas sensors 913, force/load/torque/strain/pressure sensors 915, and/or electric/magnetic sensors 917. One skilled in the art can contemplate using any combination of such sensors to collect data/information and input into the modules 610, 611, 612 of the log message analyzer 615 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for generating patterns from a set of heterogeneous log messages, the method comprising:
    collecting the set of heterogenous log messages from arbitrary or unknown systems or applications or sensors or instruments;
    splitting the log messages into tokens based on a set of delimiters;
    identifying datatypes of the tokens;
    identifying a log structure of the log messages by generating pattern-signatures of all the tokens and the datatypes based on predefined pattern settings;
    generating a pattern for each of the log structures; and
    enabling users to edit the pattern for each of the log structures based on user requirements.

2. The method of claim 1, further comprising determining whether a regular expression (RegEx) rule matches any of the tokens.

3. The method of claim 2, further comprising, if a match is determined, splitting the matched token into a plurality of tokens based on the matched RegEx rule.

4. The method of claim 3, further comprising determining a datatype for the matched token by employing datatype RegEx syntax rules.

5. The method of claim 4, further comprising memorizing the matched RegEx rule for the matched token based on the matched token's position within the log message.

6. The method of claim 5, further comprising applying the memorized RegEx rule to subsequent log messages having similar position-wise tokens by employing hash indexes.

7. The method of claim 1, further comprising maintaining an index to determine uniqueness of the pattern-signatures.

8. The method of claim 1, wherein the predefined pattern settings are HIGH, MEDIUM, and LOW.

9. The method of claim 1, wherein the patterns are in the form of a GROK expression.

10. A system for generating patterns from a set of heterogeneous log messages, the system comprising:

a memory; and a processor in communication with the memory, wherein the processor runs program code to:

collect the set of heterogenous log messages from arbitrary or unknown systems or applications or sensors or instruments;

split the log messages into tokens based on a set of delimiters;

identify datatypes of the tokens;

identify a log structure of the log messages by generating pattern-signatures of all the tokens and the datatypes based on predefined pattern settings;

generate a pattern for each of the log structures; and enable users to edit the pattern for each of the log structures based on user requirements.

11. The system of claim 10, wherein a determination is made as to whether a regular expression (RegEx) rule matches any of the tokens.

12. The system of claim 11, wherein, when a match is determined, the matched token is split into a plurality of tokens based on the matched RegEx rule.

13. The system of claim 12, wherein a datatype is determined for the matched token by employing datatype RegEx syntax rules.

14. The system of claim 13, wherein the matched RegEx rule for the matched token is memorized based on the matched token's position within the log message.

15. The system of claim 14, wherein the memorized RegEx rule is applied to subsequent log messages having similar position-wise tokens by employing hash indexes.

16. The system of claim 10, wherein an index is maintained to determine uniqueness of the pattern-signatures.

17. The system of claim 10, wherein the predefined pattern settings are HIGH, MEDIUM, and LOW.

18. The system of claim 10, wherein the patterns are in the form of a GROK expression.

19. A non-transitory computer-readable storage medium comprising a computer-readable program for generating patterns from a set of heterogeneous log messages, wherein the computer-readable program when executed on a computer causes the computer to perform the steps of:

collecting the set of heterogenous log messages from arbitrary or unknown systems or applications or sensors or instruments;

splitting the log messages into tokens based on a set of delimiters;

identifying datatypes of the tokens;

identifying a log structure of the log messages by generating pattern-signatures of all the tokens and the datatypes based on predefined pattern settings;

generating a pattern for each of the log structures; and enabling users to edit the pattern for each of the log structures based on user requirements.

20. The non-transitory computer-readable storage medium of claim 19, wherein a determination is made as to whether a regular expression (RegEx) rule matches any of the tokens;

wherein, when a match is determined, the matched token is split into a plurality of tokens based on the matched RegEx rule;

wherein a datatype is determined for the matched token by employing datatype RegEx syntax rules; and wherein the matched RegEx rule for the matched token is memorized based on the matched token's position within the log message.

* * * * *